United States Patent
Takahashi et al.

(10) Patent No.: US 7,004,612 B2
(45) Date of Patent: Feb. 28, 2006

(54) PLANAR LIGHT SOURCE DEVICE AND LIQUID-CRYSTAL DISPLAY DEVICE

(75) Inventors: Tomotsugu Takahashi, Tokyo (JP); Takahiko Ueda, Ibaraki (JP); Hiroshi Koyama, Ibaraki (JP)

(73) Assignee: Yupo Corporation, Tokyo (JP)

( * ) Notice: Subject to any disclaimer, the term of this patent is extended or adjusted under 35 U.S.C. 154(b) by 0 days.

(21) Appl. No.: 11/003,732

(22) Filed: Dec. 6, 2004

(65) Prior Publication Data

US 2005/0174508 A1    Aug. 11, 2005

Related U.S. Application Data

(63) Continuation of application No. PCT/JP03/07118, filed on Jun. 5, 2003.

(30) Foreign Application Priority Data

Jun. 6, 2002 (JP) ............... 2002-165622

(51) Int. Cl.
*F21V 7/04* (2006.01)
(52) U.S. Cl. ..................... 362/615; 362/603
(58) Field of Classification Search ................ 362/600, 362/603, 608, 615, 582
See application file for complete search history.

(56) References Cited

U.S. PATENT DOCUMENTS

| | | | | |
|---|---|---|---|---|
| 6,914,719 B1 * | 7/2005 | Koyama et al. | ............. | 359/361 |
| 2001/0033482 A1 * | 10/2001 | Funamoto et al. | ............. | 362/84 |
| 2002/0015299 A1 * | 2/2002 | Koyama et al. | ............... | 362/31 |

FOREIGN PATENT DOCUMENTS

| | | |
|---|---|---|
| EP | 1 111 440 A2 | 6/2001 |
| JP | 61-99187 | 5/1986 |
| JP | 63-62014 | 3/1988 |
| JP | 7-230004 | 8/1995 |
| JP | 7-287110 | 10/1995 |
| JP | 2001-74940 | 3/2001 |
| JP | 2001-183532 | 7/2001 |
| JP | 2002-109928 | 4/2002 |
| JP | 2002-148443 | 5/2002 |

* cited by examiner

*Primary Examiner*—Ali Alavi
(74) *Attorney, Agent, or Firm*—Oblon, Spivak, McClelland, Maier & Neustadt, P.C.

(57) ABSTRACT

Provided is a planar light source device, which comprises a light guide having at least one side end serving as a light incident side and having one surface serving as a light-emitting side, a light source disposed in the vicinity of the side end of the light guide, and a light reflector disposed on the other side opposite to the light-emitting side, and which is characterized in that the light guide is essentially formed of a polyolefin resin, the light reflector is also essentially formed of a polyolefin resin, and when a piece of the light reflector having a face size of 1.5 cm×1.5 cm is prepared, and it is pressed against the surface of the light guide with its reflective face being in contact with the surface of the light guide under a load of 135 g/cm$^2$ thereto, and, in that condition, when it is reciprocated 10 times on the surface of the light guide to a width of 5 cm every time at a speed of 2.5 cm/sec, then the surface of the light guide is not substantially scratched by it. The planar light source device is characterized in that the light guide therein is hardly scratched and the device is lightweight.

10 Claims, 1 Drawing Sheet

PLANAR LIGHT SOURCE DEVICE AND LIQUID-CRYSTAL DISPLAY DEVICE

The present application is a continuation of PCT/JP03/07118 filed on Jun. 5, 2003 and claims priority under 35 U.S.C. §119 of Japanese Patent Application No. 165622/2002 filed on Jun. 6, 2002.

BACKGROUND OF THE INVENTION

1. Field of the Invention

The present invention relates to a planar light source device and to a liquid-crystal display device comprising it, More precisely, the invention relates to a technique for reducing the weight of a planar light source device, and to a liquid-crystal display device that comprises the planar light source device favorably as the backlight system therein.

2. Description of the Related Art

Transmission-type liquid-crystal display devices are much used these days as monitors for personal computers and as display devices for thin TVs, and in such liquid-crystal display devices, in general, a planar lighting device, or that is, a backlight is disposed on the back of the liquid-crystal element therein.

The backlight has the function of converting the linear light from a linear light source such as a cold-cathode tube into planar light, Typical examples of the concrete structure of backlight are mentioned. One comprises a light source disposed just below the back of a liquid-crystal element; and the other comprises a light source disposed on the side thereof in which the light from the light source is converted into planar light though a transparent light guide such as an acrylic plate to obtain a planar light source (sidelight system). An optical element such as prism array or diffusion sheet is disposed on the light output side of the device, and a light reflector formed of a foamed polyester or the like is disposed oh the other side opposite to the light output side thereof to thereby obtain the desired optical characteristics.

The sidelight system is disclosed in, for example, JP-A 61-99187 and 63-62014. In particular, in order to more effectively utilize the general properties of lightweight and thin liquid-crystal display devices, it is desirable to use the sidelight system in which the backlight may be thin. Accordingly, sidelight-system backlights are much used in liquid-crystal display devices such as portable personal computers.

The necessary properties of such backlights are being to be on a higher level these days. In particular, in monitor display devices for notebook-side personal computers and desk-top personal computers and in large-panel thin TVs, generally used are transmission-type full-color liquid-crystal display devices. In this case, since the light transmittance of the color liquid-crystal cell is extremely low by itself, the necessary brightness of the backlight source must be inevitably high.

Accordingly, in the above-mentioned sidelight-system backlight, generally but much used is a sheet of prism array or the like so as to ensure the front brightness of the device owing to the optical light-condensing effect thereof, or a special photofunctional sheet having a light-deflecting and converting function so as to effectively utilize the output light of the device. However, much using it inevitably results in the increase in the weight of the planar light source device and therefore the increase in the weight of the liquid-crystal display device comprising it.

For solving the problem, it may be taken into consideration to use a resin that is more lightweight than ordinary acrylic resin for light guides.

However, when the light guide formed of a lightweight material is contacted with an optical reflector, then there occurs a problem in that the light guide is scratched and could not be in practical use.

SUMMARY OF THE INVENTION

Taking the prior-art problems into consideration, an object of the present invention is to provide a planar light source device in which the light guide is lightweight but is hardly scratched. Another object is to provide a liquid-crystal display device in which the backlight is stable and lightweight.

We, the present inventors have assiduously studied, and, as a result, have found that the planar light source device of the invention can attain the above-mentioned objects, which comprises a light guide having at least one side end serving as a light incident side and having one surface serving as a light-emitting side, a light source disposed in the vicinity of the side end of the light guide, and a light reflector disposed on the other side opposite to the light-emitting side, and which is characterized in that the light guide is essentially formed of a polyolefin resin, and the light reflector is also essentially formed of a polyolefin resin, and when a piece of the light reflector having a face size of 1.5 cm×1.5 cm is prepared, and it is pressed against the surface of the light guide with its reflective face being in contact with the surface of the light guide under a load of 135 g/cm$^2$ thereto, and, in that condition, when it is reciprocated 10 times on the surface of the light guide to a width of 5 cm every time at a speed of 2.5 cm/sec, then the surface of the light guide is not substantially scratched by it.

Preferably, the light guide to constitute the planar light source device of the invention has a surface hardness of from 3B to 5H in terms of the pencil hardness on the side thereof facing to the light reflector, and has a density of from 0.7 to 1.5 g/cm$^3$. Also preferably, the essential ingredient of the light guide, polyolefin resin is a cyclic polyolefin (especially having a cycloalkane structure or a cycloalkene structure as the backbone chain thereof).

Preferably, the light reflector to constitute the planar light source device of the invention contains a layer that is at least monoaxially stretched and shaped. Also preferably, the pencil hardness of the surface of the light reflector that faces the light guide is 5H or lower, and the light reflector has a porosity of from 5 to 50%. Also preferably, the light reflector has a 2% deformation compression stress in the thickness direction thereof of from 300 to 3000 gf/cm$^2$.

The invention also provides a liquid-crystal display device that comprises the above-mentioned planar light source device as the backlight source unit thereof.

BEST MODE FOR CARRYING OUT THE INVENTION

Figure 1:
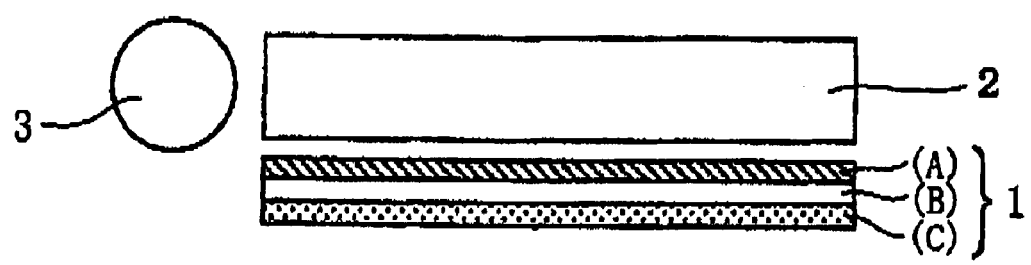
FIG. 1 is a schematic cross-sectional view of a planar light source device of one embodiment of the invention.

The constitution and the effect of the planar light source device and the liquid-crystal display device of the invention are described in detail hereinunder. In this description, the numerical range expressed by the wording "a number to another number" means the range that falls between the former number indicating the lowermost limit of the range and the latter number indicating the uppermost limit thereof.

The planar light source device of the invention comprises a light guide having at least one side end serving as a light incident side and having one surface serving as a light-emitting side, a light source disposed in the vicinity of the side end of the light guide, and a light reflector disposed on the other side opposite to the light-emitting side.

The planar light source device of the invention is characterized in that, even when the light guide and the light reflector that constitute the device are rubbed against each other, the light guide is hardly scratched. Concretely, when a piece of the light reflector having a face size of 1.5 cm×1.5 cm is prepared, and it is pressed against the surface of the light guide with its reflective face being in contact with the surface of the light guide under a load of 135 g/cm$^2$ thereto, and, in that condition, when it is reciprocated 10 times on the surface of the light guide to a width of 5 cm every time at a speed of 2.5 cm/sec, then the surface of the non-light-emitting surface of the light guide is not substantially scratched by it. In this description, the wording "not substantially scratched" means that, when the surface of the light guide is observed with an optical microscope, Olympus Optical Industry's SZX12 at a 10-time power, then the total length of the scratches seen on it is less than 2 mm. Preferably, the total length of the scratches is at most 1 mm, more preferably at most 0.5 mm, but most preferably no scratch is seen at all.

The light guide of the planar light source device of the invention has such excellent scratch resistance. Therefore, when the device is utilized in liquid-crystal display devices and when the light guide and the light reflector therein are rubbed against each other owing to the vibration they receive in service of the device, the light guide is not scratched. Accordingly, the planar light source device of the invention is extremely useful as stable backlights for liquid-crystal display devices and its practicability is high.

Light Guide

The light guide to constitute the planar light source device of the invention is essentially formed of a polyolefin resin.

The polyolefin resin includes cyclic polyolefin; ethylenic resin such as linear low-density polyethylene, high-density polyethylene, middle-density polyethylene; propylene resin; polymethyl-1-pentene. Above all, cyclic polyolefin is preferred.

The cyclic polyolefin is a polyolefin having an alicyclic structure in the backbone chain thereof. The alicyclic structure in the backbone chain includes a cycloalkane structure and a cycloalkene structure. Specific examples of the cyclic polyolefin are norbornene polymer, monocyclic olefin polymer, cyclic conjugated diene polymer and its hydrogenated derivatives, vinyl-alicyclic hydrocarbon polymer and its hydrogenated derivatives, addition polymer of cyclic olefin monomer and ethylene, and these are preferred examples.

The light guide is essentially formed of such a polyolefin resin, and the polyolefin resin content of the light guide is preferably from 80 to 100% by weight, more preferably from 90 to 100% by weight, even more preferably from 95 to 100% by weight.

The light guide may contain any other component than polyolefin resin, not too much detracting from the function thereof.

For example, the light guide may suitably contain an inorganic pigment and/or an organic filler for controlling the transparency thereof. Preferably, the amount of the inorganic fine powder and/or the organic filler that may be in the light guide is from 0 to 20% by weight, more preferably from 0 to 10% by weight, even more preferably from 0 to 5% by weight.

The inorganic fine powder includes heavy calcium carbonate, light calcium carbonate, calcined clay, silica, diatomaceous earth, talc, mica, synthetic mica, sericite, kaolinite, titanium oxide, barium sulfate, and alumina. Of those, preferred are heavy calcium carbonate, light calcium carbonate and barium sulfate.

For the organic filler, preferably selected is a resin not compatible with the polyolefin resin, the essential ingredient of the light guide. Concretely, the resin for the organic filler includes polyethylene terephthalate, polybutylene terephthalate, polycarbonate, nylon-6, nylon-6,6, cyclic olefin homopolymer, cyclic olefin-ethylene copolymer and the like having a melting point of from 120° C. to 300° C. or having a glass transition point of from 120° C. to 280° C. For example, when a polyester resin film is used for the polyolefin resin for the light guide, then the organic filler is preferably polystyrene, polycarbonate, nylon-6, nylon-6,6, polymethyl-1-pentene, cyclic olefin homopolymer, cyclic olefin-ethylene copolymer or the like having a melting point of from 120° C. to 300° C. or having a glass transition point of from 120° C. to 280° C.

One or more different types of the inorganic fine powders and the organic fillers mentioned above may be selected and used in the light guide, either singly or as combined therein. When two or more different types of them are used as combined, the inorganic fine powder and the organic filler may be mixed and used.

The light guide may be produced by kneading the polyolefin resin or a resin composition containing the polyolefin resin and the additive and then shaping it. For kneading it, employable are a single-screw extruder, a double-screw extruder, a roll, a kneader, etc. For shaping it, for example, employable is extrusion molding, injection molding, calender molding, inflation molding, pressing, blow molding or their combination. Of those, especially preferred is injection molding.

The shape of the light guide may be suitably determined depending on the use, the object and the service mode of the planar light source device of the invention. In general, it is tabular.

Preferably, the light guide in the planar light source device of the invention has a surface hardness of from 3B to 5H in terms of the pencil hardness on the side thereof facing to the light reflector, more preferably from 3B to F. If the pencil hardness thereof is over 5H, then the light guide may scratch the light reflector. If the pencil hardness thereof is lower than 3B, then the light guide may be readily scratched during manufacture or use of the planar light source device. The "pencil hardness" as referred to herein is measured under a load of 10 g, according to the method described in JIS-K-5401-69.

Preferably, the light guide in the planar light source device of the invention has a density of from 0.7 to 1.5 g/cm$^3$, more preferably from 0.8 to 1.3 g/cm$^3$. If the density of the light guide is over 1.5 g/cm$^3$, then the planar light source device may be heavy and the light guide may be a bar to weight reduction of the planar light source device. If the density thereof is less than 0.70 g/cm$^3$, then the light guide may be readily deformed by external force or the like. The "density" as referred to herein is measured according to JIS-P-8118.

In a specific area of any surface of the light guide, a dot pattern may be formed for toning the light through it. For the formation, employable is shaping, engraving or printing.

Light Reflector

The light reflector to constitute the planar light source device of the invention is essentially formed of a polyolefin resin. The polyolefin resin includes ethylenic resin such as linear low-density polyethylene, high-density polyethylene, middle-density polyethylene; propylene resin; polymethyl-1-pentene; ethylene-cyclic olefin copolymer.

The propylene resin may be, for example, propylene homopolymer, or copolymer of the essential ingredient, propylene and α-olefin such as ethylene, 1-butene, 1-hexene, 1-heptene, and 4-methyl-1-pentene. The stereospecificity of the polymer is not specifically defined, and the polymer may be isotactic or syndiotactic, or may have a different degree of stereospecificity. The copolymer may be binary, ternary, or quaternary, and may be a random copolymer or a block copolymer.

Of the propylene resin, preferred for use herein are propylene homopolymer, and propylene copolymer having a melting point not lower than 140° C. If a resin having a melting point lower than 140° C. is in the light reflector, then the molten sheet for the light reflector may stick to chill rolls when the light reflector is formed through extrusion and then cooled with chill rolls, and, if so, the surface of the light reflector may be scratched or may have white mottles, and the optical properties of the light reflector may be thereby worsened.

The polyolefin resin content of the light reflector is preferably from 30 to 99% by weight, more preferably from 35 to 97% by weight.

The light reflector may contain any other component than polyolefin resin, not too much detracting from the function thereof.

For example, the light reflector may suitably contain an inorganic pigment and/or an organic filler. Preferably, the amount of the inorganic fine powder and/or the organic filler that may be in the light reflector is from 1 to 70% by weight, more preferably from 3 to 65% by weight. If the amount of the inorganic fine powder and/or the organic filler is larger than 70% by weight, then the surface strength of the light reflector may lower. If the amount is smaller than 1%, then the light reflector may readily cause blocking.

Regarding the details of the inorganic fine powder and the organic filler for use in the light reflector, the same as those mentioned hereinabove for the light guide may be referred to.

If further desired, the light reflector to constitute the planar light source device of the invention may contain a stabilizer, a light stabilizer, a dispersant, a lubricant, etc.

For example, the light reflector may contain from 0.001 to 1% by weight of a stabilizer such as a steric-hindered phenol, phosphorus, or amine compound, from 0.001 to 1% by weight of a light stabilizer such as a steric-hindered amine, benzotriazole or benzophenone compound, and from 0.01 to 4% by weight of a dispersant for inorganic fine powder (e.g., silane coupling agent), a higher fatty acid such as oleic acid or stearic acid, metal soap, polyacrylic acid, polymethacrylic acid or a salt thereof.

The light reflector to constitute the planar light source device of the invention may have a single-layered structure, or a two-layered structure comprising a substrate layer and a surface layer, or a three-layered structure comprising a surface layer and a back layer formed on the substrate layer thereof, or a multi-layered structure having an additional resin film layer formed between the substrate and the surface layer and/or the back layer thereof. When the light reflector has a two-layered or more multi-layered structure, the it is desirable that all the constitutive layers contain a polyolefin resin.

In order to toughen the light reflector and to reduce the weight thereof and to improve the reflectivity thereof by making its inside porous, it is desirable that the light reflector has an at least mono-axially stretched layer. Regarding the number of axes for stretching, the single-layered structure may be stretched monoaxially or biaxially; the two-layered structure maybe stretched monoaxially/monoaxially, monoaxially/biaxially, or biaxially/monoaxially; the three-layered structure may be stretched monoaxially/monoaxially/biaxially, monoaxially/biaxially/monoaxially, biaxially/monoaxially/monoaxially, monoaxially/biaxially/biaxially, or biaxially/biaxially/monoaxially. In further multi-layered structures, the number of axes for stretching may be combined in any desired manner.

The stretching method is not specifically defined, and may be any known method. For example, herein employable is machine-direction stretching to be attained by utilizing the peripheral speed difference between rolls; cross-direction stretching to be attained by the use of a tenter oven; or simultaneous biaxial stretching to be attained by combination of rolling, tenter oven and linear motor.

The stretching ratio is not specifically defined, and may be suitably determined depending on the use and the object of the planar light source device and on the properties of the resin used, when a propylene homopolymer or copolymer is used for the polyolefin resin and when the sheet is stretched in one direction, then the stretching ratio is preferably from about 2 to 25 times, more preferably from 3 to 20 times. When the sheet is stretched biaxially, then the areal stretching ratio is from 9 to 80 times, more preferably from 30 to 60 times. If further desired, the stretched structure may be subjected to heat treatment as high temperature.

When the resin to be stretched is a crystalline resin, it is desirable that the resin is stretched at a temperature not lower than the glass transition point of the non-crystal part thereof and not higher than the melting point of the crystalline part thereof. The concrete stretching temperature may be suitably selected from the known temperature range suitable to the resin selected.

In general, thermoplastic resin is stretched most suitably at a temperature lower by from 2 to 60° C. than the melting point of the resin. When the resin is propylene homopolymer (melting point, 155 to 167° C.), then it is preferably stretched at 95 to 165° C.; and high-density polyethylene (melting point, 121 to 134° C.) is preferably stretched at 61 to 132° C.

Preferably, the stretching speed is selected within a range of from 20 to 350 m/min.

When a resin composition containing an inorganic fine powder and/or an organic filler is stretched, the resulting film may have fine cracks in its surface and have fine pores inside it. The pores effectively act for improving the light reflectivity of the film, for controlling the compressive elasticity in the direction of the thickness thereof and for reducing the weight of the film.

Preferably, the thickness of the stretched resin film is from 50 to 500 µm, more preferably from 80 to 350 µm.

When the light reflector has a two-layered or more multi-layered structure and when a stretched film layer and a non-stretched film layers are layered or laminated to form it, then employable is any method of casting, extrusion lamination, dry lamination or the like.

The method of forming the resin film to constitute the light reflector is not specifically defined, and may be any known method. Concretely, herein employable is cast molding of sheetwise extruding resin melts through a single-layered or multi-layered T-die or I-die connected to a screw-type extruder; calender molding, roll molding, inflation molding; removal of solvent and oil from cast-molded or calender-molded sheet of a mixture of thermoplastic resin, organic solvent and oil; or molding of thermoplastic resin solution followed by removal of solvent from it.

The shape of the light reflector for use in the invention is not specifically defined. In general, it is sheet, but may have any other shape depending on the use, the object and the service mode thereof.

Preferably, the pencil hardness of the surface of the light reflector for use in the invention that faces the light guide is 5H or lower, more preferably 3 H or lower, even more preferably 1 H or lower. If the pencil hardness thereof is higher than 5 H, then the light reflector may scratch the surface of the light guide during manufacture or use of the planar light source device.

Also preferably, the light reflector has a porosity of from 5 to 50%, more preferably from 10 to 45%, even more preferably from 15 to 40%. If the porosity thereof is larger than 50%, then the strength of the light reflector may lower. If the porosity thereof is smaller than 5%, then the light reflector may be a bar to weight reduction of the planar light source device.

The "porosity" as referred to herein means a value calculated according to the following equation (1):

$$\text{Porosity (\%)} = [(\rho_0 - \rho)/\rho_0] \times 100 \qquad (1).$$

In the formula, $\rho_0$ indicates the true density of the film, and $\rho$ indicates the density of the stretched film (JIS-P-8118). So far as the unstretched material does not contain a large amount of air, the true density of the film is almost equal to the density of the unstretched film. The density of the stretched film may be obtained by determining the unit weight ($g/m^2$) of the light reflector followed by dividing it by the thickness ($\mu m$) of the light reflector determined with a micrometer or through electronic microscope observation (unit weight/thickness).

Preferably, the light reflector for use in the invention has a 2% deformation compression stress in the thickness direction thereof of from 300 to 3000 $gf/cm^2$, more preferably from 350 to 2800 $gf/cm^2$, even more preferably from 400 to 2500 $gf/cm^2$.

If the 2% deformation compression stress in the thickness direction thereof is smaller than 300 $gf/cm^2$, then the light reflector may be readily wrinkled. If the 2% deformation compression stress in the thickness direction thereof is larger than 3000 $gf/cm^2$, then the light reflector may scratch the surface of the light guide during manufacture or use of the planar light source device.

The "2% deformation compression stress in the thickness direction" as referred to herein is a value measured according to the method mentioned below.

Concretely, a pressure unit is fitted to a tensile tester, Autograph AGS-5kND (by Shimadzu), and the sample to be analyzed is compressed with it at a compression speed of 1 mm/min, whereupon the compression stress under which the sample shows 2% deformation as determined with a CCD laser displacement sensor LK3100 (by Keyence) is read in the tensile tester.

The "2% deformation" as referred to herein means that the degree of displacement of the compressed light reflector is 2% of the thickness of the non-compressed light reflector.

Planar Light Source Device and Liquid-Crystal Display Device

Using the light guide and the light reflector formed according to the methods mentioned above, the planar light source device of the invention may be produced.

The planar light source device of the invention is a sidelight-type planar light source device. A concrete constitution example of the planar light source device of the invention is shown in FIG. 1.

In the planar light source device of FIG. 1, the upper face of the light guide (2) is a light-emitting side thereof; and the left-side face thereof is a light incident side thereof. A light reflector (1) is disposed on the other side opposite to the light-emitting side of the light guide (2); and a light source (3) is disposed in the vicinity of the light incident side of the light guide (2). The light emitted by the light source runs into the light guide through its light incident side, and goes out through its light-emitting side along with the light reflected by the light reflector.

The light reflector (1) is so disposed that it may reflect light inside the light guide (2) and may efficiently emit light through the light-emitting side of the light guide. Preferably, the light reflector (1) entirely covers the other side opposite to the light-emitting side of the light guide, but may partly cover it in consideration of the use, the object and the service mode thereof.

The light source (3) for use in the planar light source device of the invention may be suitably selected from any ordinary ones generally used in planar light source devices. One typical example of the light source is a linear light source such as a cold-cathode lamp.

A diffusion sheet may be disposed on the light-emitting side of the planar light source device of the invention. For the material of the diffusion sheet, mentioned are cyclic polyolefin, ethylene resin, propylene resin, and polyethylene resin. Preferably, the thickness of the diffusion sheet is from 50 to 500 $\mu m$, more preferably from 70 to 300 $\mu m$.

Since the light reflector (1) and the light guide (2) in the planar light source device of the invention are both formed of a polyolefin resin as the essential ingredient thereof, the device is more lightweight than conventional devices. In addition, since the light guide is hardly scratched even when the light reflector and the light guide are rubbed against each other owing to vibration or the like, another advantage of the light source device of the invention is that its stability as a light source is high.

Using the planar light source device of the invention, a liquid-crystal display device can be produced.

The liquid-crystal display device as referred to herein is for image display by the use of liquid-crystal cells as arrays of optical shutters, in which the orientation condition of the liquid crystal is varied owing to the electro-optical effect, or that is, the optical anisotropy (refractive anisotropy) of the liquid-crystal molecules and by applying an electric field to any desired display units or by passing electric current through them to thereby change the optical transmittance or the reflectance of the units so as to drive the device.

The liquid-crystal display device is constructed by disposing, for example, a diffusion sheet, a lens film, a brightness-improving film, a polarizer, an optically-compensatory plate, a liquid-crystal cell, an optically-compensatory plate and a polarizer in that order on the light-emitting side of the planar light source device.

Concretely, the liquid-crystal display device includes a transmission-type simple matrix-drive super-twisted nematic mode device, a transmission-type active matrix-drive twisted nematic mode device, a transmission-type active matrix-drive in-plane switching mode device, a transmission-type active matrix-drive multi-domain vertical align mode device.

When the planar light source device of the invention is used as a backlight source to construct a liquid-crystal display device, then its brightness is essentially high and it may be a more lightweight device than the backlight source unit in ordinary liquid-crystal display devices.

The invention is described more concretely with reference to the following Examples, Comparative Example and Test Example. Not overstepping the scope of the invention, the materials and their amount and ratio and the operations mentioned below may be suitably changed. Accordingly, the scope of the invention should not be limited to the following examples.

The details of the materials used in the examples are shown in the following Table.

TABLE 1

| Compound | Details |
|---|---|
| PP1 | propylene homopolymer [Nippon Polychem's Novatec PP:EA8] (MFR (230° C., 2.16 kg load) = 0.8 g/10 min), melting point (167° C., DSC peak temperature) |
| PP2 | propylene homopolymer [Nippon Polychem's Novatec PP:MA4] (MFR (230° C., 2.16 kg load) = 5 g/10 min), melting point (167° C., DSC peak temperature) |
| HDPE | high-density polyethylene [Nippon Polychem's Novatec HD:HJ360] (MFR (190° C., 2.16 kg load) = 5.5 g/10 min), melting point (134° C., DSC peak temperature) |
| (a) heavy calcium carbonate | heavy calcium carbonate having a mean particle size of 0.97 µm (Maruo Calcium's Caltex 7) |
| (b) heavy calcium carbonate | heavy calcium carbonate having a mean particle size of 1.8 µm (Bihoku Funka Kogyo's Softon 1800) |
| (c) light calcium carbonate | light calcium carbonate having a mean particle size of 0.07 µm (Maruo Calcium's MC-5) |
| (d) barium sulfate | barium sulfate having a mean particle size of 0.5 µm (Sakai Chemical Industry's B-54) |
| titanium oxide | titanium dioxide having a mean particle size of 0.2 µm (Ishihara Sangyo's CR-60) |

EXAMPLE 1

A composition (B) comprising PP1, HDPE, and filler of heavy calcium carbonate and titanium dioxide; and compositions (A) and (C) each comprising PP2, HDPE and filler of heavy calcium carbonate and titanium dioxide were melt-kneaded in different three extruders at 250° C. The blend ratio by weight of each composition is as in Table 2. Next, the resulting melts were fed into one coextrusion die, in which (A) and (C) were laminated on both sides of (B), and these were sheetwise extruded out and cooled with a chill roll to about 60° C. to prepare a laminate (A/B/C).

The laminate was re-heated at 145° C. and then stretched to the draw ratio as in Table 2, in the machine direction by utilizing the peripheral speed difference between a large number of rolls, and thereafter this was annealed at 160° C., and its edges were trimmed away to obtain a light reflector formed of a multi-layered stretched resin film.

A cyclic polyolefin (Nippon Zeon's trade name, Zeonoa 1060R) was used for a light guide.

The light guide and the light reflector were combined to construct a planar light source device having the light guide disposed on the side of the surface layer (A) of the light reflector (FIG. 1),

EXAMPLE 2

A composition (B) comprising PP1, HDPE, and filler of heavy calcium carbonate and titanium dioxide; and compositions (A) and (C) each comprising PP2, HDPE and filler of heavy calcium carbonate and titanium dioxide were melt-kneaded in different three extruders at 250° C. The blend ratio by weight of each composition is as in Table 2. Next, the resulting melts were fed into one coextrusion die, in which (A) and (C) were laminated on both sides of (B), and these were sheetwise extruded out and cooled with a chill roll to about 60° C. to prepare a laminate (A/B/C).

The laminate was re-heated at 145° C., then stretched to the draw ratio as in Table 2, in the machine direction by utilizing the peripheral speed difference between a large number of rolls, then again re-heated at about 150° C. and stretched by the use of a tenter in the cross direction to the draw ratio as in Table 2. Next, this was annealed at 160° C. and then cooled to 60° C., and its edges were trimmed away to obtain a light reflector formed of a multi-layered stretched resin film. The surface layer (A) is to be in contact with the light guide when a liquid-crystal display is constructed.

Using the light reflector obtained herein and the light guide described in Example 1, a planar light source device was constructed in the same manner as in Example 1.

EXAMPLE 3

A composition (B) comprising PP1, HDPE, and filler of heavy calcium carbonate and titanium dioxide was melt-kneaded in an extruder at 250° C. The blend ratio by weight of the composition (B) is as in Table 2. Next, this was sheetwise extruded out and cooled with a chill roll to about 60° C. to obtain a non-stretched sheet. Thus obtained, the non-stretched sheet was re-heated at 145° C. and stretched to the draw ratio as in Table 2, in the machine direction by utilizing the peripheral speed difference between a large number of rolls.

Compositions (A) and (C) each comprising PP2, HDPE and filler of heavy calcium carbonate and titanium dioxide were melt-kneaded in different extruders at 250° C. The blend ratio by weight of each composition is as in Table 2. Next, each melt was sheetwise extruded out and laminated on both faces of the stretched film of the composition (B) obtained in the previous step as above, as in the constitution shown in Table 2. Next, this was cooled with a chill roll to about 60° C. to obtain a laminate (A/B/C).

The laminate was re-heated at about 150° C., then stretched to the draw ratio as in Table 2, in the cross direction by the use of a tenter. Next, this was annealed at 160° C. and then cooled to 60° C., and its edges were trimmed away to obtain a light reflector formed of a multi-layered stretched resin film. The surface layer (A) is to be in contact with the light guide when a liquid-crystal display is constructed.

Using the light reflector obtained herein and the light guide described in Example 1, a planar light source device was constructed in the same manner as in Example 1.

EXAMPLE 4

A composition (B) comprising PP1, HDPE, and filler of light calcium carbonate and titanium dioxide; and compositions (A) and (C) each comprising PP2, HDPE and filler of light calcium carbonate and titanium dioxide were melt-kneaded in different three extruders at 250° C. The blend ratio by weight of each composition is as in Table 2. Next, the resulting melts were fed into one coextrusion die, in which (A) and (C) were laminated on both sides of (B), and these were sheetwise extruded out and cooled with a chill roll to about 60° C. to prepare a laminate (A/B/C).

The laminate was re-heated at 145° C., then stretched to the draw ratio as in Table 2, in the machine direction by utilizing the peripheral speed difference between a large number of rolls, then again re-heated at about 150° C. and stretched by the use of a tenter in the cross direction to the draw ratio as in Table 2. Next, this was annealed at 160° C. and then cooled to 60° C., and its edges were trimmed away to obtain a light reflector formed of a multi-layered stretched resin film. The surface layer (A) is to be in contact with the light guide when a liquid-crystal display is constructed.

Using the light reflector obtained herein and the light guide described in Example 1, a planar light source device was constructed in the same manner as in Example 1.

EXAMPLE 5

A composition (B) comprising PP1, HDPE, and filler of barium sulfate and titanium dioxide; and compositions (A) and (C) each comprising PP2, HDPE and filler of barium sulfate and titanium dioxide were melt-kneaded in different three extruders at 250° C. The blend ratio by weight of each composition is as in Table 2. Next, the resulting melts were fed into one coextrusion die, in which (A) and (C) were laminated on both sides of (B), and these were sheetwise extruded out and cooled with a chill roll to about 60° C. to prepare a laminate (A/B/C).

The laminate was re-heated at 145° C., then stretched to the draw ratio as in Table 2, in the machine direction by utilizing the peripheral speed difference between a large number of rolls, then again re-heated at about 150° C. and stretched by the use of a tenter in the cross direction to the draw ratio as in Table 2. Next, this was annealed at 160° C. and then cooled to 60° C., and its edges were trimmed away to obtain a light reflector formed of a multi-layered stretched resin film. The surface layer (A) is to be in contact with the light guide when a liquid-crystal display is constructed.

Using the light reflector obtained herein and the light guide described in Example 1, a planar light source device was constructed in the same manner as in Example 1.

COMPARATIVE EXAMPLE 1

A commercially-available white polyester film (Toray's trade name, E60L) was used for a light reflector.

Using the light reflector and the light guide described in Example 1, a planar light source device was constructed in the same manner as in Example 1.

TEST EXAMPLE

The light reflectors produced in Examples 1 to 5 and in Comparative Example 1 were tested for the friction, the 2% deformation compression stress, the pencil hardness and the porosity thereof.

<1> Friction Test:

A piece of the light reflector having a size of 1.5 cm×1.5 cm was fitted to the back side (non-light-emitting side, pencil hardness B) of the light guide formed of a cyclic polyolefin resin (Nippon Zeon's trade name, Zeonoa 1060R) having a density of 1.01 g/cm$^3$ in such a manner that the reflective side of the reflector could be in contact with the back side of the light guide, and this was reciprocated 10 times to a width of 5 cm each, at a speed of 2.5 cm/sec and under a load of 135 g/cm$^2$. The surface of the light guide was observed with an optical microscope, Olympus Optical Industry's SZX12 at a 10-time power, and checked for scratches. When some scratches were found on the surface, then the length of each scratch was measured, and the data of all scratches were summed up. The samples thus tested were evaluated according to the following 3 ranks.

○: No scratch was found.

Δ: Substantial scratches were not found (the total length of the scratches was less than 2 mm).

x: Great scratches were found, and practical use of the sample is problematic (the total length of the scratches was 2 mm or more).

<2> Determination of 2% Deformation Compression Stress:

A pressure unit was fitted to a tensile tester, Autograph AGS-5kND (by Shimadzu), and the light reflector sample to be analyzed was compressed with it at a compression speed of 1 mm/min, whereupon the compression stress under which the sample showed 2% deformation as determined with a CCD laser displacement sensor LK3100 (by Keyence) was read in the tensile tester.

<3> Pencil Hardness Test:

According to the method described in JIS-K5401-69, a pencil was applied under a load of 10 g to the sample to be tested, and the surface of the sample was visually checked for scratches.

<4> Determination of Porosity:

According to JIS-P-8118, the density and the true density of the stretched film were measured, and the porosity of the film was obtained according to the above-mentioned equation (1).

The measured data are shown in Table 2 and Table 3.

TABLE 2

| | Composition of Surface Layer (A) (% by weight) | | | | Composition of Substrte Layer (B) (% by weight) | | | | Composition of Back Layer (C) (% by weight) | | | |
|---|---|---|---|---|---|---|---|---|---|---|---|---|
| | PP 2 | HDPE | Filler | TiO$_2$ | PP 1 | HDPE | Filler | TiO$_2$ | PP 2 | HDPE | Filler | TiO$_2$ |
| Example 1 | 97 | — | (a) 2.5 | 0.5 | 29 | 6 | (a) 60 | 5 | 97 | — | (a) 2.5 | 0.5 |
| Example 2 | 70 | — | (a) 29.5 | 0.5 | 61 | 6 | (a) 30 | 3 | 97 | — | (a) 2.5 | 0.5 |
| Example 3 | 55 | — | (b) 44.5 | 0.5 | 71 | 6 | (b) 20 | 3 | 55 | — | (b) 44.5 | 0.5 |
| Example 4 | 97 | — | (c) 2.5 | 0.5 | 59 | 6 | (c) 30 | 5 | 97 | — | (c) 2.5 | 0.5 |
| Example 5 | 97 | — | (d) 2.5 | 0.5 | 59 | 6 | (d) 30 | 5 | 97 | — | (d) 2.5 | 0.5 |
| Comp. Example 1 | | | | | White Polyester Film | | | | | | | |

TABLE 2-continued

|  | Layer Thickness A/B/C (μm) | Stretch Magnification | | Draw Ratio MD/CD | Areal Ratio MD * CD | Porosity (%) |
|---|---|---|---|---|---|---|
|  |  | MD | CD |  |  |  |
| Example 1 | 1/168/1 | 8.0 | 1.0 | 8.00 | 8.0 | 45 |
| Example 2 | 1/168/1 | 4.2 | 8.5 | 0.49 | 35.7 | 43 |
| Example 3 | 41/168/41 | 4.2 | 8.5 | 0.49 | 35.7 | 45 |
| Example 4 | 1/168/1 | 4.2 | 8.5 | 0.49 | 35.7 | 30 |
| Example 5 | 1/168/1 | 4.2 | 8.5 | 0.49 | 35.7 | 45 |
| Comp. Example 1 |  | White Polyester Film | | | | |

TABLE 3

|  | Scratch Resistance of Light Guide | 2% Compression Stress (gf/cm²) | Pencil Hardness Test (10 g load) |
|---|---|---|---|
| Example 1 | ◯ | 800 | 6B or less |
| Example 2 | ◯ | 1200 | 6B |
| Example 3 | ◯ | 1000 | 6B |
| Example 4 | Δ | 2300 | 3H |
| Example 5 | ◯ | 1300 | 5B |
| Comp. Example 1 | X | 4700 | 6H or more |

INDUSTRIAL APPLICABILITY

According to the invention, the light guide is not scratched even when it is rubbed against the light reflector owing to vibration or the like while the planar light source device is manufactured or is built in a liquid-crystal display device and used therein, In addition, the invention realizes weight reduction of the planar light source device and the liquid-crystal display device comprising it.

The present disclosure relates to the subject matter contained in Japanese Patent Application No. 165622/2002 filed on Jun. 6, 2002, which is expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A planar light source device, which comprises a light guide having at least one side end serving as a light incident side and having one surface serving as a light-emitting side, a light source disposed in the vicinity of the side end of the light guide, and a light reflector disposed on the other side opposite to the light-emitting side, wherein the light guide is essentially formed of a polyolefin resin, the light reflector is also essentially formed of a polyolefin resin, and when a piece of the light reflector having a face size of 1.5 cm×1.5 cm is prepared, and it is pressed against the surface of the light guide with its reflective face being in contact with the surface of the light guide under a load of 135 g/cm² thereto, and, in that condition, when it is reciprocated 10 times on the surface of the light guide to a width of 5 cm every time at a speed of 2.5 cm/sec, then the surface of the light guide is not substantially scratched by it.

2. The planar light source device as claimed in claim 1, wherein the light guide has a surface hardness of from 3B to 5H in terms of the pencil hardness on the side thereof facing to the light reflector.

3. The planar light source device as claimed in claim 1, wherein the light guide has a density of from 0.7 to 1.5 g/cm³.

4. The planar light source device as claimed in claim 1, wherein the light guide is essentially formed of a cyclic polyolefin.

5. The planar light source device as claimed in claim 4, wherein the cyclic polyolefin has a cycloalkane structure or a cycloalkene structure as the backbone chain thereof.

6. The planar light source device as claimed in claim 1, wherein the light reflector contains a layer that is at least monoaxially stretched and shaped.

7. The planar light source device as claimed in claim 1, wherein the pencil hardness of the surface of the light reflector that faces the light guide is 5H or lower.

8. The planar light source device as claimed in claim 1, wherein the light reflector has a porosity of from 5 to 50%.

9. The planar light source device as claimed in claim 1, wherein the light reflector has a 2% deformation compression stress in the thickness direction thereof of from 300 to 3000 gf/cm².

10. A liquid-crystal display device characterized by comprising the planar light source device of claim 1 as a backlight source thereof.

* * * * *